United States Patent [19]

Keating et al.

[11] Patent Number: 4,805,722
[45] Date of Patent: Feb. 21, 1989

[54] ANTI THEFT SYSTEM FOR MOTOR VEHICLES AND THE LIKE

[76] Inventors: William Keating; John Flanagan, both of 90-40 80th St., Woodhaven, N.Y. 11421

[21] Appl. No.: 66,558
[22] Filed: Jun. 26, 1987
[51] Int. Cl.$^4$ .......................... B60R 25/04; G08B 1/00
[52] U.S. Cl. ............................... 180/287; 307/10 AT; 340/309.15; 340/52 R; 340/63
[58] Field of Search ...................... 280/287, 288, 289; 307/10 AT; 340/63, 64, 52 R, 309.15; 361/172

[56] References Cited
U.S. PATENT DOCUMENTS

| | | | |
|---|---|---|---|
| 3,790,933 | 2/1974 | Cort | 307/10 AT |
| 4,366,466 | 12/1982 | Lutz | 307/10 AT |
| 4,463,340 | 7/1984 | Adkins et al. | 307/10 AT |
| 4,616,208 | 10/1986 | Nakanura | 340/309.15 |
| 4,624,578 | 11/1986 | Green | 340/309.15 |

Primary Examiner—David M. Mitchell
Assistant Examiner—Karin Ferriter
Attorney, Agent, or Firm—Richard L. Miller

[57] ABSTRACT

An anti theft vehicle system for motor vehicles and the like is provided which uses a magnetically or optically encoded card inserted into a card reader mounted in the vehicle to limit operation of the vehicle. The vehicle ID number is stored in a control computer along with continuously updated date and time. If the vehicle ID of the card and computer match, and the data and time are within the authorized operation date and time encoded on the card, the vehicle will operate. The remaining time of authorized use is displayed. If there is no match the vehicle ignition and fuel line are blocked and hood is locked thereby foiling any attempt to circumvent this security system by bypassing it. Should the operator inadvertently leave the card in the reader while attempting to leave the vehicle the vehicle ignition will continue to operate until the card is removed thereby reminding the operator to remove the card. Additional data may be encoded upon the card for purposes of accounting or inventory control.

8 Claims, 1 Drawing Sheet

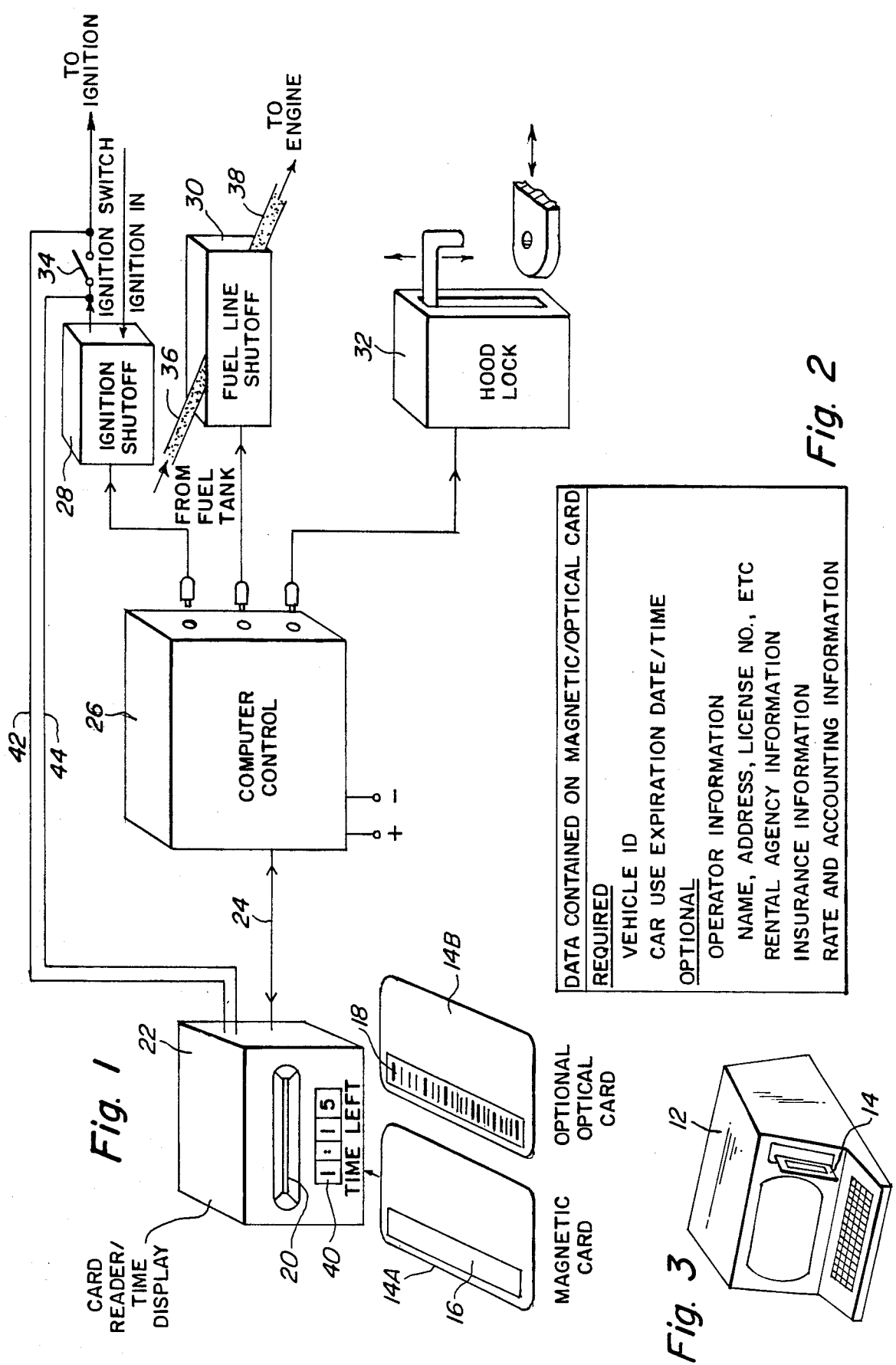

ANTI THEFT SYSTEM FOR MOTOR VEHICLES AND THE LIKE

BACKGROUND OF THE INVENTION

The instant invention relates generally to the field of security systems, and, more specifically to the field of systems to prevent the theft or unauthorized use of motor vehicles.

At present the theft and unauthorized use of motor vehicles represents a cost and loss of resources that society and the individual can no longer sustain. Organizations that rent motor vehicles are in a particular quandary because not only must they deal with theft and unauthorized use by parties unknown, they must also deal with the intentional and unintentional continued use of the vehicle by the lessee past the agreed upon rental period.

No existing inventions designed to insure the security of a motor vehicle successfully address all of these problems.

SUMMARY OF THE INVENTION

It is, therefore, a primary object of the present invention to provide an anti theft system for motor vehicles and the like in which the ability to operate the vehicle is contingent upon the insertion of a magnetically or optically encoded card into a card reader.

Another object is to provide an anti theft system for motor vehicles and the like in which the data encoded on the card determines the output of a computer control which enables or disables an ignition shutoff, a fuel line shutoff and a hood lock. If the card inserted matches the vehicle ID number stored in the computer control and the actual date and time is within the time period coded into the card the vehicle will operate.

A still further object is to provide an anti theft system for motor vehicles and the like which will not allow the operator to shut down the ignition of the vehicle unless the card is removed thereby discouraging him from accidentally leaving the card in the card reader.

A yet further object is to provide an anti theft system for motor vehicles and the like which uses a time display to alert the operator that only a limited time period remains for the operation of the vehicle.

A yet still further object is to provide an anti theft system for motor vehicles and the like in which further optional information can be stored on the card for accounting, inventorying and other purposes.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illlustrated and described within the scope of the appended claims.

BRIEF DESCRIPTION OF THE DRAWING FIGURES

The figures in the drawings are briefly described as follows:

FIG. 1 is a block diagram of the invention;

FIG. 2 is a chart indicating required and optional data to be stored in either magnetic and/or optical storage medium on a security access enabling card; and FIG. 3 illustrates a typical computer which is used to program data in the storage medium on a typical security access enabling card shown partly inserted in the console.

DETAILED DESCRIPTION OF THE PREFERRED EMBODIMENTS

The computer 12 illustrated in FIG. 3 is used to program information onto a security access enabling card 14. This card may store information in magnetic form as in magnetic card 14A with magnetic strip 16, or the card may store information in optically coded format as in optical card 14B with typical bar code strip 18. The data stored in either format is listed in FIG. 2. The minimum required information includes the vehicle ID number and the car use expiration date/time, i.e. the time for which the vehicle operation is authorized. Additional optional data such as operator information (name, address, license number, etc.), rental agency information, insurance information, rate and accounting information, etc., may be stored for accounting and inventorying purposes.

In operation, when the operator enters the vehicle he inserts either card 14A or 14B into slot 20 in card reader/time display 22. Electrical signals which represent the data contained on the card are output along 24 to computer control 26. Computer control 26 has a memory which stores a unique vehicle ID number as well as the continuously updated date and time. Computer control 26 compares its own vehicle ID number and date and time to that contained on the card.

If there is a match, computer control 26 enables ignition shutoff 28, fuel line shutoff 30, and hood lock 32. Ignition shutoff 28 is in series electrically between the vehicle's ignition switch 34 and the ignition. When enabled it allows the ignition switch to activate the ignition. Fuel line shutoff 30 is in series with the line from fuel tank 36 and the line to engine 38. When enabled, fuel line shutoff 30 allows fuel to flow from the gas tank of the vehicle to the engine.

When enabled, hood lock 32 unlatches the hood so that the engine compartment is accessible for servicing. When locked, hood lock 32 prevents the defeat of the invention by blocking access to systems located under the hood of the vehicle.

If there is no match between information contained on cards 14 and computer control 26 the ignition shutoff 28 disables the ignition, fuel line shutoff 30 blocks fuel to the engine, and hood lock 32 blocks access under the hood.

Whenever card 14 is inserted into card reader/time display 22 the difference between the actual time stored in computer control 26 and the authorized vehicle use time stored on card 14 is displayed in window 40. After vehicle use, if the operator attempts to shut the vehicle down by turning off ignition switch 34, a bypass circuit, wires 42 and 44, bypass ignition switch 34 and the vehicle will continue to operate until card 14 is removed. This discourages the operator from inadvertently leaving card 14 in slot 20.

While certain novel features of this invention have been shown and described and are pointed out in the annexed claims, it will be understood that various omissions, substitutions and changes in the forms and the details of the device illustrated and in its operation can be made by those skilled in the art without departing from the spirit of the invention.

What is claimed is:

1. An anti theft system for motor vehicles and the like, comprising:
   (a) a computer control which contains a date/time clock and has in its memory a vehicle ID number;
   (b) a card reader/time display input/output device which converts information stored on a card into electrical signals decodeable by said computer control and displays the time remaining for the operation of said motor vehicle and the like; and
   (c) at least one output vehicle shutdown device wherein said output device is controllable by said computer control, and wherein said card reader/time display comprises a magnetic card reader whereby said magnetic card reader will prevent the enabling of an ignition shutoff until a magnetic card is removed thereby discouraging an operator from leaving said vehicle without first removing said magnetic card.

2. An anti theft system for motor vehicles and the like, as recited in claim 1, further comprising a magnetic encoded card.

3. An anti theft system for motor vehicles and the like, as recited in claim 2, wherein the information stored on said magnetic card comprises a vehicle ID number and a card use expiration date such that said computer control compares said vehicle ID number and the current date/time to that contained in said magnetic card thereby disabling said ignition shutoff, fuel line shutoff and hood lock should a match occur and thereby enabling said ignition shutoff, fuel line shutoff and hood lock should a mismatch occur.

4. An anti theft system for motor vehicles and the like, as recited in claim 2, wherein the information stored on said magnetic card further comprises optional information useful for accounting and inventory control.

5. An anti theft system for motor vehicles and the like, comprising:
   (a) a computer control which contains a date/time clock and has in its memory a vehicle ID number;
   (b) a card reader/time display input/output device which converts information stored on a card into electrical signals decodeable by said computer control and displays the time remaining for the operation of said motor vehicle and the like; and
   (c) at least one output vehicle shutdown device wherein said output device is controllable by said computer control, and wherein said card reader/time display comprises an optical card reader whereby said optical card reader will prevent the enabling of an ignition shutoff until an optical card is removed thereby discouraging an operator from leaving said vehicle without first removing said optical card.

6. An anti theft system for motor vehicles and the like, as recited in claim 5, further comprising an optically encoded card.

7. An anti theft system for motor vehicles and the like, as recited in claim 6, wherein the information stored on said optically encoded card comprises a vehicle ID number and a card use expiration date such that said computer control compares said vehicle ID number and the current date/time to that contained in said optically encoded card thereby disabling said ignition shutoff, fuel line shutoff and hood lock should a match occur and thereby enabling said ignition shutoff, fuel line shutoff and hood lock should a mismatch occur.

8. An anti theft system for motor vehicles and the like, as recited in claim 6, wherein the information stored on said optical card further comprises optional information useful for accounting and inventory control.

* * * * *